United States Patent [19]
Lochridge

[11] 3,728,865
[45] Apr. 24, 1973

[54] PIPELINE LAYING OPERATIONS WITH DIVERSE PENETRATION ANGLES

[75] Inventor: Joe C. Lochridge, Houston, Tex.

[73] Assignee: Brown & Root, Inc., Houston, Tex.

[22] Filed: Aug. 11, 1971

[21] Appl. No.: 170,780

[52] U.S. Cl. ..........................61/72.3, 193/1, 193/15
[51] Int. Cl. ..........................F16l 1/00, B63b 35/04
[58] Field of Search.................61/72.3, 72.1, 72.4; 166/.6; 193/1, 15

[56] References Cited
UNITED STATES PATENTS

| | | | |
|---|---|---|---|
| 3,431,739 | 3/1969 | Richardson et al. | 61/72.3 |
| 3,487,648 | 1/1970 | Lawrence | 61/72.3 |

*Primary Examiner*—Jacob Shapiro
*Attorney*—James E. Cockfield

[57] ABSTRACT

Apparatus for laying an elongate flexible means, such as a pipeline, from a surface vessel into a body of water. The vessel is provided with a plurality of essentially predetermined feed paths for diverse penetration angles into the water. The feed paths are continuously available for use depending upon the size of the pipeline to be laid.

9 Claims, 8 Drawing Figures

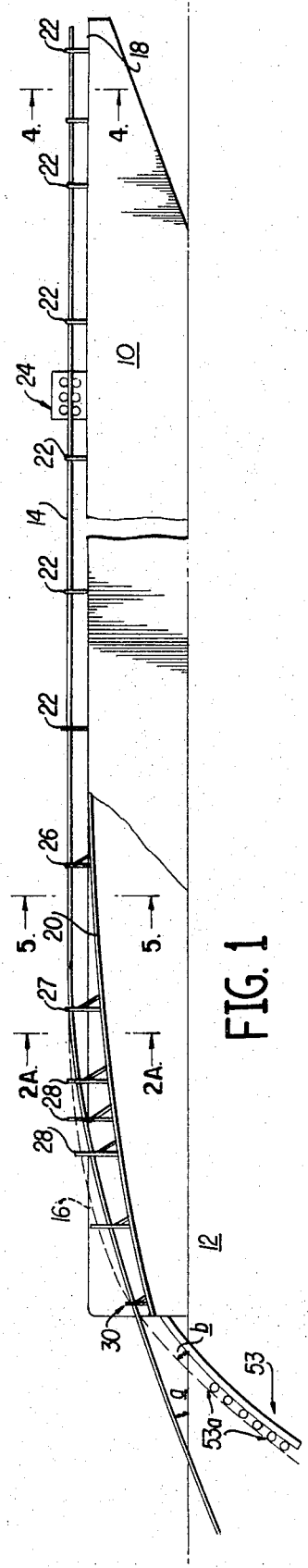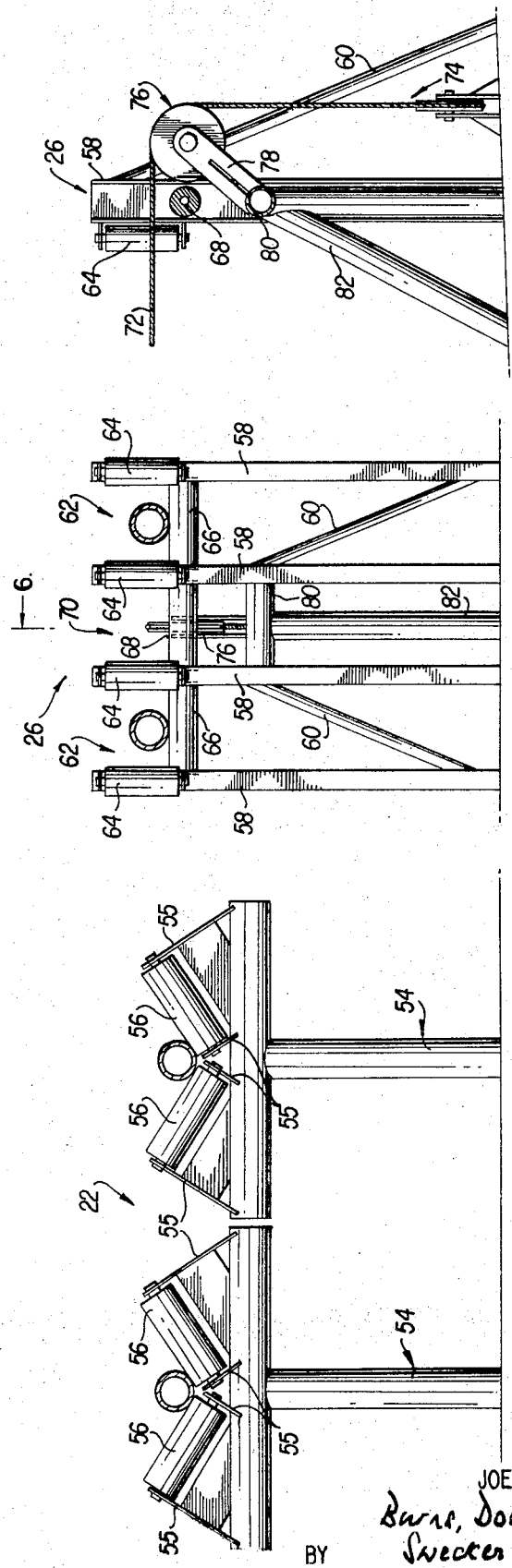

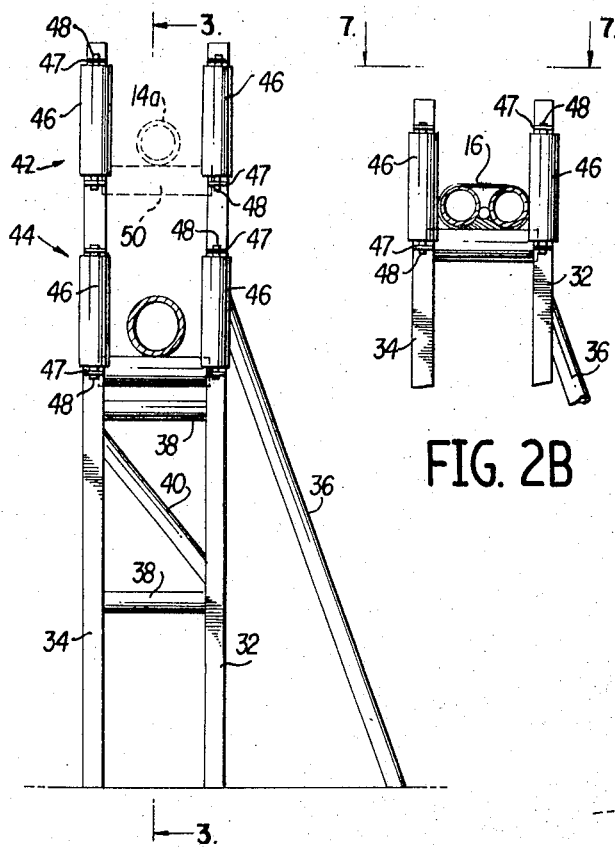
FIG. 2A
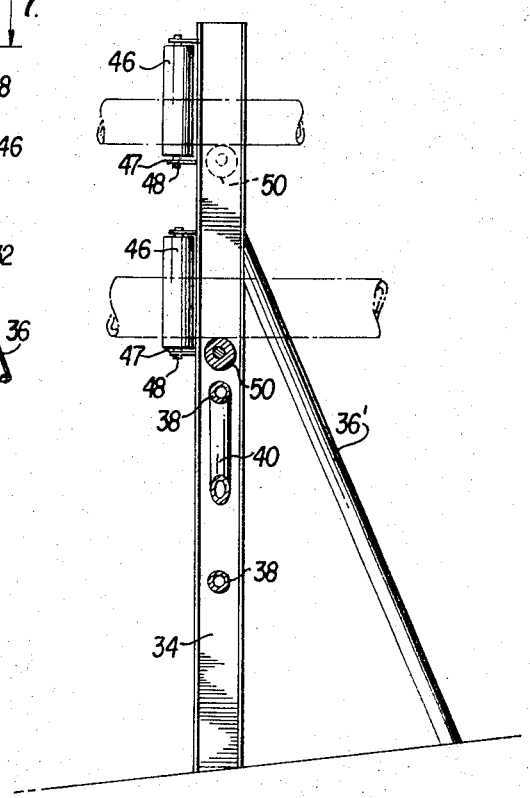
FIG. 2B
FIG. 3
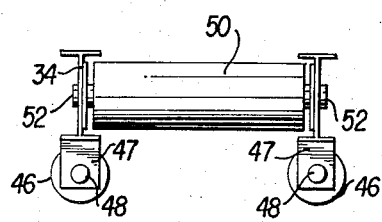
FIG. 7

3,728,865

PIPELINE LAYING OPERATIONS WITH DIVERSE PENETRATION ANGLES

BACKGROUND OF THE INVENTION

This invention relates to apparatus for laying an elongate flexible means, such as a pipeline, from a surface vessel into a body of water.

In offshore pipeline laying operations, the desirability of controlling the angle of penetration of a pipeline into the water body as it leaves a floating vessel has long been recognized. Generally it is desirable to provide the smallest radius of curvature of the pipeline being laid (i.e., the largest penetration angle) consistent with system parameters such as pipeline diameter, etc. In this fashion tension requirements during the pipeline laying operation may be minimized.

One technique for controlling the pipeline penetration angle utilizing an inclined ramp mounted on the floating vessel is set forth in copending and commonly assigned application Ser. No. 28,732 filed Apr. 15, 1970, for "Pipeline Laying System Utilizing An Inclined Ramp."

The present invention relates to a different technique finding particular utility in laying operations involving the laying of a plurality of pipelines at the same site. An example of such an operation may be found in the disclosure of copending and commonly assigned application Ser. No. 113,252 filed Feb. 8, 1971, for "Method And Apparatus For Providing Offshore Installation."

Where a plurality of pipelines are to emanate from or terminate adjacent the same site, and where the pipelines are to be of different diamenters and/or yield strength levels (i.e., grade), it will be appreciated that it would be desirable to provide for variations in the penetration angle in accordance with the diameter and/or yield strength of the pipeline involved in the operation at a given time.

However, it would be desirable to make such provision without entailing the necessity of extensive disassembly of the floating vessel mounted pipeline supports defining the pipeline feed path for one pipeline and the complete construction of a new support system for another pipeline feed path. The costs involved in such a feed path modification would be underirable insofar as the laying operation would be interrupted for considerable time.

In an operation as discussed above, wherein different feed paths are utilized to provide different penetration angles it would also be desirable to economically provide stable supports for the pipeline while providing different feed paths.

OBJECTS AND SUMMARY OF A PREFERRED FORM OF THE INVENTION

Recognizing the desirability of providing for diverse penetration angles in pipeline laying operations, and particularly in such operations involving the laying of a plurality of pipelines at the same site, and recognizing the further desirability of avoiding significant interruptions of the laying operation by reason of disassembly and reconstruction of diverse pipeline support systems, it is an object of the present invention to provide a pipeline laying operation wherein a plurality of feed paths for the pipeline on the floating vessel are defined by pipeline supports and wherein the diverse feed paths are continuously available for use during the laying operation.

It is a further object of the present invention to economically provide stable supports defining those diverse feed paths.

A preferred form of the invention intended to accomplish the foregoing objects entails the provision of a floating vessel means with a plurality of essentially predetermined feed paths for diverse penetration angles, the feed paths being continuously available for use depending upon the size and/or yield strength of the pipeline, or elongate flexible means, involved in the operation. The floating vessel may include a fixed inclined ramp portion on which a plurality of generally longitudinally spaced support stations are located. It will be appreciated, however, that the invention may also be practiced on a flat-deck type barge or vessel.

These support stations include pipeline guiding and supporting sections which establish the diverse feed paths. Preferably the guiding and supporting sections, in a two feed path form of the present invention, are vertically superposed for establishing the desired pipeline elevation as appropriate for the ultimately established penetration angle.

If desired, a lead support station on the fixed inclined ramp may provide for laying of a pipeline bundle according to the technique set forth in copending and commonly assigned for patent by Leif H. Smith filed July 2, 1971, for "Method and Apparatus for Laying Pipelines Grouped in a Bundle."

The present invention also envisions the provision of a fixed guide shoe attached to the floating vessel for continuing the feed path defined by the support stations on the floating vessel.

Other objects and advantages of the present invention will become apparent from the following detailed description with reference to the accompanying drawings in which like numerals refer to like elements and in which:

THE DRAWINGS

FIG. 1 is a transverse elevational view depicting a floating vessel engaged in a pipeline laying operation through practice of the present invention;

FIG. 2A is a front elevational view of a support station located on a fixed inclined ramp portion of the floating vessel according to the present invention and taken along line 2A-2A of FIG. 1;

FIG. 2B is a partial front elevational view of the upper section of the support station of FIG. 2A illustrating the laying of pipelines grouped in a bundle;

FIG. 3 is a cross-sectional view of the support station of FIG. 2 taken along lines 3—3 therein;

FIG. 4 is a front elevational view of an initial support station taken along line 4—4 of FIG. 1;

FIG. 5 is a front elevational view of a support and cable payout station that may be employed in laying pipeline grouped in a bundle and taken along line 5—5 of FIG. 1; and FIG. 6 is a cross-sectional view of the station of FIG. 5 taken along line 6—6 therein; and FIG. 7 is a partial plan view of the support station of FIG. 2B, absent a pipeline bundle, and taken along line 7—7 therein.

DETAILED DESCRIPTION

General Summary

With reference now to FIG. 1, a schematic depiction of a pipeline laying operation according to the present invention may be seen. A floating vessel means 10 on a water body 12, is depicted as slidably supporting, on rotatable rollers as hereinafter more fully described, an elongate flexible means, a portion of which depends into the water body toward a submerged surface. As the vessel means is moved forward the elongate flexible means is paid out into the water body 12.

The elongate flexible means so supported may be a single conduit 14 or a group of conduits schematically indicated at 16. These conduits are bundled together and paid out as a pipeline bundle through practice of the invention disclosed in the aforementioned application for patent entitled "Method and Apparatus for Laying Pipelines Grouped in a Bundle," the disclosure of which is hereby incorporated by reference.

The vessel 10, as illustrated, is comprised of a forward deck section 18 and a fixed delivery deck, shown in the preferred embodiment as an inclined ramp portion 20, extending off of the forward deck section 18 and on the starboard side of the vessel. Spaced along the forward deck section 18 are a plurality of generally longitudinally aligned support stations 22 hereinafter more fully described. Seven such stations are depicted in FIG. 1 and the stations together comprise an initial feed path zone for the elongate flexible means.

Suitable provision may be made for the joining, as by welding, of additional pipe sections (not shown) to the continuous elongate flexible means at initial ones of the stations. Additionally, in the case of a single conduit forming the continuous elongate flexible means, suitable provision for paying out the conduit under dynamic tension conditions may be made by using a tensioning unit, schematically shown at 24, of the type more fully described in U.S. Lawrence Pat. No. 3,390,532.

According to the present invention a plurality of elongate flexible means may be laid from the floating vessel means 10 at an appropriate penetration angle into the water body 12. For this purpose a plurality of support stations 26, 27, 28 and 30 are provided in spaced, generally longitudinally aligned relationship on the inclined ramp portion 20.

These stations are also generally longitudinally aligned with the initial support stations 22 and together provide means continuously available to define a plurality of diverse feed paths for the elongate flexible means. In the illustrated embodiment of the invention a two feed path system is envisioned and the ramp support station 26 may additionally function as a cable payout station in operations involving laying of pipelines grouped in a bundle as hereinafter more fully described. The next support station 27 and the terminal support station 30 may be utilized to provide the same elevation for the elongate flexible means in either of the feed paths.

Intermediate support stations 28 provide superposed guiding and support sections as hereinafter more fully described to enable establishment of a selected one or the other of two penetration angles. The provision of four such stations 28 has been found desirable to provide desired penetration angles when the conduit 14 is to laid has about a ten inch diameter and when the bundle 16 to be laid is comprised of two conduits of about four inch diameter.

In any event, the support stations on the inclined ramp portion 20 are operable to guide an elongated flexible means along a selected feed path having an established penetration angle corresponding to that desired for the particular pipeline being laid. As illustrated, the penetration angle when the pipeline bundle 16 is being laid is steeper than that employed when the conduit 14 is being laid.

Detailed Structure and Operation

With reference to FIGS. 2A and 2B details of a preferred form of the intermediate support stations 28 on the inclined ramp portion 20 may be seen. Each of these stations is comprised of an upstanding frame means including a pair of generally vertically extending support members 32 and 34. These members are suitably secured at their base to the inclined ramp 20.

Brace members 36, 36' may be suitably employed to brace the frame means. Additional generally horizontal brace members 38 and a diagonal brace member 40 may also be provided to interconnect the support members 32 and 34 at a lower zone thereof so as to increase the rigidity of the frame.

The upper zone of the support station is provided with two superposed sections 42 and 44 utilized for lateral guiding of the elongate flexible means passing therethrough, and for slidably supporting the elongate flexible means and rotatable rollers. Each of these sections 42 and 44 includes spaced and generally parallel lateral guiding rollers 46. Each lateral guiding roller is generally vertically disposed and is mounted on one of the frame means support members 32 and 34 on suitable brackets 47 (see FIGS. 2A, 2B and 3), by means of roller shafts 48, for rotation about generally vertical axes. The brackets 47 are, of course, suitably attached to the support members 32 and 34.

Additionally, each section 42 and 44 includes generally horizontal support rollers 50 mounted for rotation about generally horizontal axes by means of pins 52 (see FIG. 7) connected to the support members 32 and 34 by suitable cooperating mounting means on the support members 32 and If desired, the connection between the pins 52 and the support members can be readily removable so that, for example, the support roller 50, indicated in phantom in FIGS. 2A and 3, at the upper guiding and support section 42 can be inserted and removed as desired.

The elevation of the upper and lower guiding and support sections 42 and 44 of the intermediate support stations 28 is appropriately selected so as to provide two feed paths establishing the two desired penetration profiles illustrated in FIG. 1. In this connection it may be noted that the other support stations 27 and 30 are substantially identical to the intermediate support stations 28 except that they each need only be provided with a single guiding and support section insofar as the elevation of the elongate flexible means at these stations 27 and 30 is identical for both feed paths.

As will thus be appreciated, the generally longitudinal support rollers 50 of the support stations 27 and 30 serve, along with the support rollers 50 of the upper sections 42 at the intermediate stations 28, to define a first pipeline feed path which is designed for a first penetration angle. Similarly, the support rollers 50 of the lower sections 44 of the intermediate support stations 28 serve, along with the generally horizontal support rollers at the support stations 27 and 30, to define a second pipeline feed path, diverse from the first, and designed for a second penetration angle. While these feed paths are employed alternately, the upper and lower sections 42 and 44 of the intermediate support stations are continuously available to define the plural diverse feed paths.

It may be, for example, that the conduit 14 has a ten inch diameter and that the lower of the superposed feed paths provides a desirable penetration angle for the pipeline laying operation. As a general rule, if a smaller diameter conduit is to be laid immediately thereafter (as in the case of providing a plurality of pipelines emanating from the same site), a larger angle of water entry would be desirable.

Thus, while the feed path defined in part by the generally horizontal rollers 50 of the lower guiding and support sections 44 of the intermediate support stations 28 would be acceptable for the 10-inch diameter conduit, the feed path defined in part at the upper sections 42 would be desirably employed for the smaller, i.e., 4-inch diameter, conduit indicated in phantom at 14a in FIG. 2A. The same would apply in the case of the conduit bundle formed of two 4-inch diameter conduits and depicted in FIG. 2B, i.e., the upper sections 42 are employed to give a larger penetration angle.

With renewed reference to FIG. 1 it will become apparent that the angle of entry a of the ten inch diameter conduit 14 into the water body 12 is established as smaller than the angle of entry b of the bundle 16 of four inch diameter conduits. In each case, the feed paths along the initial support stations 22 on the deck section 18 of the vessel and at the ramp stations 26, 27 and 30 may be identical in elevation, with the selected penetration angle being established by alternate use of one or the other of the guiding and support sections 42 and 44 of the intermediate ramp stations 28.

At this juncture it may be noted that a guide shoe, illustrated schematically at 53 in FIG. 1, may be employed to define a continuation of the feed path at the established penetration angle. This guide shoe may be comprised of a generally rigid member curved to the desired profile of the elongate flexible means being laid and rigidly secured to the end of the vessel 10 so as to depend into the body of water. The guide shoe 53 may be provided with conventional roller supports at appropriate locations 53a. Such roller supports could, of course, be formed of individual horizontally-positioned rollers, or formed of a plurality of roller pairs, the rollers of each pair being arranged in a V-shaped manner to define a trough-shaped path.

Although the fixed guide shoe 53 is illustrated in connection with the feed path for the bundle 16 it will be apparent that a similar, but appropriately contoured, fixed guide shoe can be employed for laying of the single conduit 14 after removal of the illustrated guide shoe 53. In this connection, however, it may be preferable to make the roller supports individually vertically adjustable to enable the guide shoe to accommodate different feed paths.

It will also be apparent that buoyant stingers, pivotally connected to the vessel 10, may in some instances by employed in lieu of the fixed guide shoe.

It will further be apparent that in some instances no guide shoe or stinger need be employed on the vessel as a continuation of the vessel feed path.

As illustrated specifically in FIG. 4, the initial stations 22 are particularly adapted for laying of pipelines in a bundle according to the invention in the above mentioned disclosure incorporated by reference. Each station may be comprised of a pair of upright generally T-shaped frames 54. On these frames are provided roller-mounting brackets 55, which rotatably mount guide and support rollers 56 in a manner mutually inclined from the vertical. The inclined rollers 56 of the frames 54 thus each define a generally V-shaped conduit guiding and supporting seat. As illustrated, in a bundle laying operation wherein two conduits are employed, one conduit is associated with the seat of a frame 54 and the generally aligned frames 54 of the subsequent stations 22.

The bundling and cable payout station 26 located on the ramp portion 20 is shown more particularly in FIGS. 5 and 6. This station 26 may include a plurality of generally upright support members 58 along with braces 60. Two guiding and support sections indicated at 62 may be provided by lateral guiding rollers 64 and generally horizontal support rollers 66 suitably mounted on the support members 58 in a manner similar to the arrangement described earlier in connection with the intermediate stations 28. One each of the sections 62 may be generally aligned with the feed paths defined at the support stations 22 to provide a continuation thereof at generally the same elevation.

An additional support roller 68 mounted on the intermediate support members 58 for rotation about a generally horizontal axis may be employed for single conduit laying operations if desired. Lateral guiding for such operations may be provided by the intermediate generally vertical rollers 64. This intermediate guiding and support section 70 so defined may be aligned with (i.e., bounded by generally the same vertical planes as) the support sections 42 and 44 of the subsequent support stations 27, 28 and 30. It will be appreciated that in instances of such single conduit laying operations the feed path of the conduit undergoes a lateral deflection as the conduit passes from the initial stations 22 to the station 26.

In the case of a bundle laying operation such lateral deflection also is involved as the conduits undergo lateral convergence between the support sections 62 or the station 26 and the support sections of the next station 27. Bundle profile is controlled in such operations by a cable 72 (see FIG. 6) provided by means of a cable feed pulley 74 and a cable supply pulley 76 located at the station 26 in a manner set forth in the above incorporated disclosure.

At this juncture it may be noted that a bracket 78 on which the cables supply pulley 76 is located may be pivotally supported, on the upper member 80 of a generally centrally located T-shaped support, for selective downward pivoting to an inoperative position when single conduit operations are undertaken. The T-shaped support may be braced by a member 82.

It will be apparent that alternate arrangements of the support stations 22 is possible in order to avoid the lateral deflection of the conduit during instances of single conduit laying operations. In one case, the T-shaped frames 54 of each support station 22 may be shifted wherein one of the frames 54 is in alignment with the intermediate guiding and support section 70 of station 26. With such an arrangement, lateral deflection would occur only during a bundle laying operation, and even then only with respect to one of the conduits forming the bundle.

In yet another case, one of the frames 54 of each support station 22 may be cut-off and removed, and the other frame 54 may be then realigned relative to the intermediate guiding and support section 70. Such an arrangement would thus serve to eliminate lateral deflection during the laying of a single conduit.

Thus it may be seen that according to the present invention a plurality of feed paths are continuously available to provide diverse penetration angles depending on the characteristics of the elongate flexible means being laid from the floating vessel 10. Laying operations, wherein a plurality of different pipelines are provided at the same site are particularly enhanced.

Significantly, changes may be made in the pipeline being laid without costly interruptions for modifying the penetration angle. Moreover, stable supports defining the various feed paths are economically provided.

Although the invention has been described with reference to a preferred form thereof, it will be appreciated that additions, modifications, substitutions and deletions may be made without departing from the spirit or scope of the invention as defined in the appended claims.

What is claimed is:

1. Apparatus for supporting and guiding selected elongate flexible means during laying thereof into a body of water and onto a submerged surface, said apparatus comprising:
  a floating vessel means including a fixed delivery deck portion; and
  a plurality of support stations spaced generally longitudinally along said delivery deck portion for supporting the selected elongate flexible means with a portion thereof depending from the floating vessel means into the body of water;
  said support stations including means for defining a plurality of diverse feed paths for respective laying of a selected elongate flexible means;
  at least some of said support stations being operable to define portions of a plurality of said diverse feed paths;
  one of said feed paths establishing a first penetration angle for one selected elongate flexible means passing into the body of water;
  at least another of said feed paths establishing a second penetration angle for another selected elongate flexible means passing into the body of water;
  said support stations being operable to guide a pipeline along a selected one of the said feed paths having an established penetration angle corresponding to a desired penetration angle of the selected elongate flexible means.

2. Apparatus for supporting and guiding selected elongate flexible means during laying thereof into a body of water and onto a submerged surface, said apparatus comprising:
  a floating vessel means including a fixed delivery deck portion; and
  a plurality of support stations spaced generally longitudinally along said delivery deck portion for supporting the selected elongate flexible means with a portion thereof depending from the floating vessel means into the body of water;
  said support stations including means for defining a plurality of diverse feed paths for respective laying of a selected elongate flexible means;
  one of said feed paths establishing a first penetration angle for one selected elongate flexible means passing into the body of water;
  at least another of said feed paths establishing a second penetration angle for another selected elongate flexible means passing into the body of water;
  said support stations being operable to guide a pipeline along a selected one of the said feed paths having an established penetration angle corresponding to a desired penetration angle of the selected elongate flexible means;
  each of said plurality of support stations comprising an upstanding frame means; and
  intermediate ones of said frame means each including at least two generally vertically spaced guiding and support sections associated with different ones of said feed paths.

3. Apparatus according to claim 2 wherein said guiding and support sections of said intermediate frame means are generally vertically superposed.

4. Apparatus according to claim 3 wherein each of said guiding and support sections includes a pair of laterally spaced generally vertical guide rollers rotatably mounted on said frame means and means for rotatably supporting a generally horizontally disposed roller on said frame means adjacent the lower ends of said generally vertical guide rollers.

5. Apparatus according to claim 1 and further including a substantially rigid guide shoe fixedly mounted on said vessel means adjacent an end of said delivery deck portion and extending into said body of water to define a continuation of a selected one of said feed paths.

6. Apparatus according to claim 1 wherein said feed paths lie in a generally common vertical plane.

7. Apparatus according to claim 2 wherein a guiding and support section on the rearward-most frame means defines a point common to two of said feed paths.

8. Apparatus according to claim 3 wherein each of said guiding and support sections includes a pair of laterally spaced generally vertically-disposed guide members mounted on said frame means and means for rotatably supporting a generally horizontally disposed roller on said frame means adjacent the lower ends of said generally vertically-disposed guide members.

9. A method for supporting and guiding selected elongate flexible means during laying thereof into a body of water and onto a submerged surface, said method utilizing: a floating vessel means including a fixed delivery deck portion; a plurality of support stations spaced generally longitudinally along said delivery deck portion and including means for defining a plurality of diverse feed paths; the method comprising:
  guiding a first elongate flexible means from said vessel along one of said plurality of diverse feed paths having a penetration angle for said first elongate flexible means; and subsequently guiding a second elongate flexible means from said vessel along another of said plurality of diverse feed paths having a penetration angle for said second elongate means, and being defined by at least some of the support stations defining said one feed path.

* * * * *